US012411989B2

(12) United States Patent
Szvath et al.

(10) Patent No.: US 12,411,989 B2
(45) Date of Patent: Sep. 9, 2025

(54) SYSTEM AND METHOD FOR PROVIDING THIRD PARTY ACCESS TO A SYSTEM

(71) Applicant: The Toronto-Dominion Bank, Toronto (CA)

(72) Inventors: Richard Titus Szvath, Mississauga (CA); Vitali Valoshyn, Oakville (CA); Fabio Taddei, Woodbridge (CA)

(73) Assignee: The Toronto-Dominion Bank, Toronto (CA)

( * ) Notice: Subject to any disclaimer, the term of this patent is extended or adjusted under 35 U.S.C. 154(b) by 307 days.

(21) Appl. No.: 17/953,865

(22) Filed: Sep. 27, 2022

(65) Prior Publication Data
US 2024/0104249 A1 Mar. 28, 2024

(51) Int. Cl.
*G06F 21/00* (2013.01)
*G06F 21/31* (2013.01)
*G06F 21/62* (2013.01)

(52) U.S. Cl.
CPC ............ *G06F 21/629* (2013.01); *G06F 21/31* (2013.01)

(58) Field of Classification Search
CPC .............................. G06F 21/629; G06F 21/31
See application file for complete search history.

(56) References Cited

U.S. PATENT DOCUMENTS

| | | | |
|---|---|---|---|
| 7,797,190 B1 * | 9/2010 | Peden ................ | G06Q 30/0235 709/224 |
| 9,646,297 B2 | 5/2017 | Van Den Broeck et al. | |
| 10,621,653 B2 | 4/2020 | Isaacson et al. | |
| 11,010,804 B1 | 5/2021 | Rygaard et al. | |
| 11,093,985 B2 * | 8/2021 | Narula ................ | G06Q 20/401 |
| 11,151,646 B1 | 10/2021 | Simon | |
| 11,367,059 B2 | 6/2022 | Bloy et al. | |
| 11,416,889 B2 * | 8/2022 | Salari ................ | G06Q 30/0277 |
| 11,551,200 B1 * | 1/2023 | Cook ................ | G06Q 20/3226 |
| 2001/0032170 A1 * | 10/2001 | Sheth ................ | G06Q 10/103 705/26.1 |
| 2002/0029267 A1 * | 3/2002 | Sankuratripati ....... | G06Q 30/02 709/224 |
| 2002/0087496 A1 * | 7/2002 | Stirpe ................ | G09B 5/00 706/45 |

(Continued)

OTHER PUBLICATIONS

Co-branded Customer Portal, Published in [ https://kbase.oncenter.com/article/AA-04156/0/01-What-is-the-Co-Branded-Customer-Portal.html ], pp. 3, Aug. 10, 2020.

*Primary Examiner* — Don G Zhao
(74) *Attorney, Agent, or Firm* — Borden Ladner Gervais LLP

(57) ABSTRACT

Computing platforms, methods, and storage media for providing third party access to a co-branded product in a system are disclosed. In an example, a system may receive, at a system of a first entity, registration information of a user registered with a second entity. The system may comprise a record associating the user with a co-branded product jointly provided by the first entity and the second entity. The system may validate, using at least one hardware processor, the registration information at the system based on the record. The system may initiate, using the at least one processor, in response to a successful validation of the registration information, a new user session having a co-branded product session identifier where the new user session provides access to the user to the co-branded product in the system.

18 Claims, 8 Drawing Sheets

(56) References Cited

U.S. PATENT DOCUMENTS

| | | | |
|---|---|---|---|
| 2002/0111942 A1* | 8/2002 | Campbell | G06F 16/958 |
| 2004/0054622 A1* | 3/2004 | Strayer | G06Q 20/204 |
| | | | 705/40 |
| 2004/0122736 A1* | 6/2004 | Strock | G06Q 30/0207 |
| | | | 705/14.31 |
| 2004/0162986 A1* | 8/2004 | Metzger | H04L 63/08 |
| | | | 713/176 |
| 2005/0065981 A1* | 3/2005 | Blinn | G06Q 10/10 |
| 2008/0098122 A1* | 4/2008 | Metzger | H04L 63/123 |
| | | | 709/229 |
| 2011/0173684 A1* | 7/2011 | Hurry | G06F 21/34 |
| | | | 726/6 |
| 2012/0018506 A1* | 1/2012 | Hammad | G06Q 20/385 |
| | | | 235/375 |
| 2012/0311684 A1* | 12/2012 | Paulsen | G06Q 20/4014 |
| | | | 726/6 |
| 2013/0013991 A1* | 1/2013 | Evans | H04N 21/4828 |
| | | | 715/250 |
| 2013/0191227 A1* | 7/2013 | Pasa | G06Q 20/027 |
| | | | 705/41 |
| 2013/0254115 A1* | 9/2013 | Pasa | G06Q 20/367 |
| | | | 705/67 |
| 2013/0334300 A1* | 12/2013 | Evans | H04N 21/47217 |
| | | | 235/494 |
| 2014/0020068 A1* | 1/2014 | Desai | G06Q 20/3227 |
| | | | 726/4 |
| 2014/0089185 A1* | 3/2014 | Desai | G06Q 10/067 |
| | | | 705/41 |
| 2014/0095251 A1* | 4/2014 | Huovilainen | G06Q 30/0201 |
| | | | 705/7.29 |
| 2014/0095286 A1* | 4/2014 | Drewry | G06Q 30/02 |
| | | | 705/14.26 |
| 2014/0249916 A1* | 9/2014 | Verhaeghe | G06Q 30/0633 |
| | | | 705/14.51 |
| 2014/0279534 A1* | 9/2014 | Miles | G06Q 20/4016 |
| | | | 705/44 |
| 2014/0337209 A1 | 11/2014 | Maiya et al. | |
| 2015/0019402 A1 | 1/2015 | Berlin et al. | |
| 2015/0032635 A1* | 1/2015 | Guise | G06Q 20/409 |
| | | | 705/72 |
| 2016/0078430 A1* | 3/2016 | Douglas | G06Q 30/0185 |
| | | | 705/43 |
| 2016/0078568 A1* | 3/2016 | Trivedi | G06Q 50/01 |
| | | | 705/33 |
| 2016/0087957 A1* | 3/2016 | Shah | H04L 63/205 |
| | | | 726/1 |
| 2019/0043138 A1* | 2/2019 | Blake | G06Q 20/102 |
| 2019/0273745 A1* | 9/2019 | Oberg | G06Q 10/02 |
| 2020/0034897 A1* | 1/2020 | Berger | G06Q 30/06 |
| 2020/0382480 A1* | 12/2020 | Isaacson | G06Q 20/384 |
| 2020/0387923 A1* | 12/2020 | Mitchell | G06Q 20/387 |
| 2021/0090040 A1 | 3/2021 | Dintenfass et al. | |
| 2021/0287194 A1 | 9/2021 | Arumugam | |
| 2022/0215382 A1* | 7/2022 | Chen | G06Q 30/0251 |
| 2022/0292543 A1* | 9/2022 | Henderson | G06Q 30/0252 |
| 2024/0323260 A1* | 9/2024 | Morrison | G06F 3/04815 |

\* cited by examiner

*Name/Logo of 2$^{nd}$ Company*

Access your (2$^{nd}$ Company) (product) Account online

Get online access to your product(s) account in 4 easy steps:
1. Provide your product details and personal information
2. Review and accepts the Terms and Conditions
3. Chose your Login Name and Password
4. Set up challenge questions and answers

Provide your Personal Information
Please enter your legal name, as it appears on your product receipt.

First Name _____  Last Name _____

Date of Birth _____  Postal Code _____

Provide your (2$^{nd}$ Company) (product) details
Your Receipt Number and Account Number appear in the top-left corner of your product receipt.

Receipt Number _____  Account Number _____

[ Cancel ]    [ Continue ]

*Name/Logo of 1$^{st}$ Company*

FIG. 4

*Name/Logo of 2nd Company*

Log in with your (2$^{nd}$ Company) (co-pending product) account

Username

Password

☐ Remember Me

Log in

Forgot username or passord? >

Don't have a (2$^{nd}$ Company) (co-pending product) account?

Register Now

Why doesn't my (2$^{nd}$ Company) (co-pending product) login work here?

Your (2$^{nd}$ Company) (co-pending product) login is different from your regular login for (2$^{nd}$ Company)

*Name/Logo of 1$^{st}$ Company*

Have a question?
Contact us 1-888-555-0000

FIG. 5

```
┌─────────────────────────────────────────────────────────┐
│  ┌──────────────┐                                        │
│  │ Name/Logo of │   My Accounts                          │
│  │ 2ⁿᵈ Company  │                                        │
│  └──────────────┘                                        │
│                                                          │
│         (co-pending product) account summary             │
│                                                          │
│    My product(s)                                         │
│    Product:          Status:           Amount:           │
│    Total                           $2,560.00     │
│    XXXX              active            $2,560.00         │
│    YYYY              active            n/a               │
│                                                          │
│                  ┌──────────────┐                        │
│                  │ Name/Logo of 1ˢᵗ │                    │
│                  │   Company    │                        │
│                  └──────────────┘                        │
│                                                          │
│                   Have a question?                       │
│                   Contact us 1-888-                      │
│                       555-0000                           │
└─────────────────────────────────────────────────────────┘
```

FIG. 6

```
┌─────────────────────────────────────────────────────────┐
│  ┌──────────────┐                                        │
│  │ Name/Logo of │   My Accounts                          │
│  │ 2ⁿᵈ Company  │                                        │
│  └──────────────┘                                        │
│  ▓▓▓▓▓▓▓▓▓▓▓▓▓▓▓▓▓▓▓▓▓▓▓▓▓▓▓▓▓▓▓▓▓▓▓▓▓▓▓▓▓▓▓▓▓▓▓▓▓▓▓▓▓▓  │
│  ▓ Product XXXX account details                       ▓  │
│  ▓ Current balance: $2,560.00                         ▓  │
│  ▓▓▓▓▓▓▓▓▓▓▓▓▓▓▓▓▓▓▓▓▓▓▓▓▓▓▓▓▓▓▓▓▓▓▓▓▓▓▓▓▓▓▓▓▓▓▓▓▓▓▓▓▓▓  │
│                                                          │
│   Product Details                                    │
│   Payments                      Next Payment             │
│   $600 | monthly | external account *1030  Jul 03, 2022  │
│                                                          │
│   Original Balance  Interest Rate  Issue Date   Remaining Term │
│   $3708.90          3.52%          Apr 19, 2022  5 months │
│                                                          │
│                  ┌──────────────┐                        │
│                  │ Name/Logo of 1ˢᵗ │                    │
│                  │   Company    │                        │
│                  └──────────────┘                        │
│                                                          │
│                   Have a question?                       │
│                   Contact us 1-888-                      │
│                       555-0000                           │
└─────────────────────────────────────────────────────────┘
```

FIG. 7

*Name/Logo of 2nd Company*

< Back to Profile & Settings

Security Settings

 Username
Your username
You don't have a Username yet

 Password
••••••••

 Security Code Phone Number List
To call or text you with one-time security codes
+1 (•••) ••• - 7890

 Security Email
To send security alerts when changes are made to your secure info
abcde@fgh.com

 Security Code Login Option
Your preference for when a security code is needed
Only to confirm my identity

*Name/Logo of 1st Company*

Have a question?
Contact us 1-888-555-0000

FIG. 8

SYSTEM AND METHOD FOR PROVIDING THIRD PARTY ACCESS TO A SYSTEM

FIELD

The present disclosure relates generally to third party access to computing devices and systems, including but not limited to computing platforms, methods, and storage media for providing third party access to a system.

BACKGROUND

Companies, institutions, and other entities often provide an online service to allow their customers to view and manage their products. For example, an online service may enable customers to view and manage their accounts and products using a computing device, such as viewing account activity, making modifications to the products, which could include services, changing user information such as address details or payment information, and so on. The term "online" may simply refer to remote access by a customer to a computer system of the company, and may involve the internet, another computer communication network, or any other computer based communication channel or technology.

From time to time, a company may team up with a third party organization to provide one or more products or services to customers of the third party organization. The products may be advertised as being jointly provided by the company and the third party organization, and in this sense the products may be considered to be co-branded. One example is a retailer teaming up with another company to provide products or services to the customers of the retailer. The retailer provides the customers for the products or services, while the other company facilitates or provides the actual products or services.

Currently, online services provided by computer systems of companies generally do not enable access by non-customers their online service. Thus, computer systems of these companies generally are not configured to provide electronic access to customers of the third party organization to access co-branded products. Thus, these computer systems generally do not have the functionality to provide a co-branded experience to non-customers.

Improvements in computerized systems and associated technologies are desirable.

The above information is presented as background information only to assist with an understanding of the present disclosure. No assertion or admission is made as to whether any of the above, or anything else in the present disclosure, unless explicitly stated, might be applicable as prior art with regard to the present disclosure.

BRIEF DESCRIPTION OF THE DRAWINGS

Embodiments of the present disclosure will now be described, by way of example only, with reference to the attached Figures.

FIG. 4 is an example user interface screen for registering a user for access to the co-branded product in the system.

FIG. 5 is an example user interface screen for a user to log into the system for access to the co-branded product.

FIG. 6 is an example user interface screen displaying an account summary of the user associated with a co-pending product.

FIG. 7 is an example user interface screen showing account details relating a co-pending product.

FIG. 8 is an example user interface screen security settings for the account or user profile of the user.

DETAILED DESCRIPTION

Figure 1:
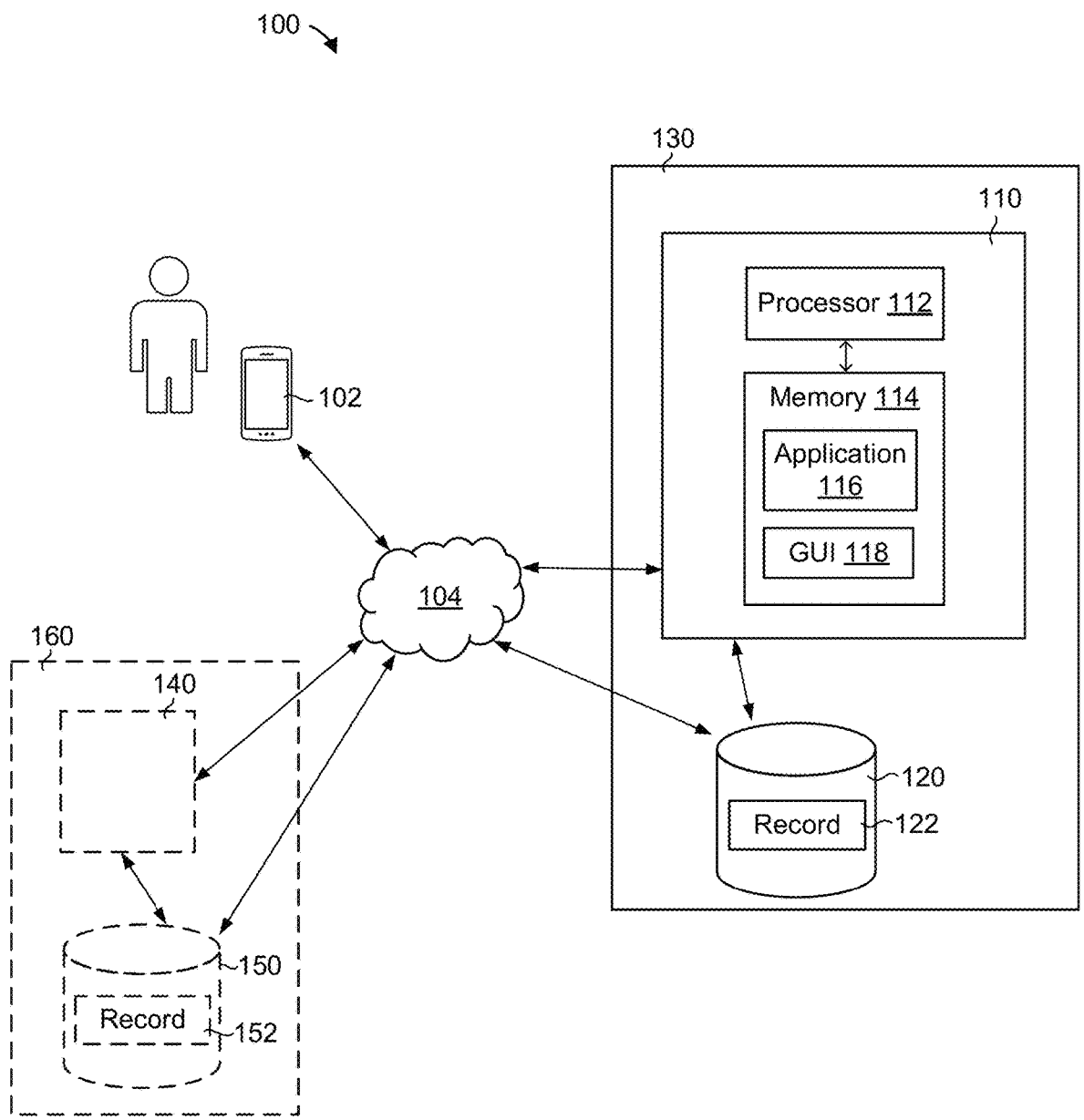
FIG. 1 is an example system in accordance with the present disclosure.

The present disclosure, in an aspect, generally relates to improvements in computing devices and systems to provide a user portal for enabling non-customers of a first entity, for example a company or other institution, to access a co-branded product that they have purchased in a system of the first entity. The non-customers of the first entity may be customers of a second entity and the access to the system of the first entity may allow these customers to access one or more products or services that are jointly provided by the first and second entities in a co-branded fashion. A jointly provided product is generally referred to herein as a co-branded product. In an embodiment, the non-customers of the first entity would otherwise not be provided with access to the system of the first entity.

For simplicity, the term "product(s)" is used herein generally to include one or more products and/or services. In addition, for simplicity, the term "customer" is used herein generally to include any suitable relationship between an individual (e.g. user) and an entity, and thus is not limited to only customers. In addition, for simplicity, the term "purchase" is used herein generally to refer to the creation of an association between a user and a product. Thus, the term is not meant to be limited to only purchases.

One aspect of the present disclosure relates to a computing platform or other apparatus configured for providing third party access to a system. The computing platform may include a non-transient computer-readable storage medium having executable instructions embodied thereon. The computing platform may include one or more hardware processors configured to execute the instructions. The processor(s) may execute the instructions to receive, at a system of a first entity, registration information of a user registered with a second entity. The system may include a record associating the user with a co-branded product jointly provided by the first entity and the second entity. The processor(s) may execute the instructions to validate, using at least one hardware processor, the registration information at the system based on the record. The processor(s) may execute the instructions to initiate, using the at least one processor, and at the system in response to a successful validation of the registration information, a new user session having a co-branded product session identifier. The new user session may provide access to the user to the co-branded product in the system.

Another aspect of the present disclosure relates to a method, which may include receiving, at a system of a first entity, registration information of a user registered with a second entity. The system may include a record associating the user with a co-branded product jointly provided by the first entity and the second entity. The method may include validating, using at least one hardware processor, the registration information at the system based on the record. The method may include initiating, using the at least one processor, and at the system in response to a successful validation of the registration information, a new user session having a co-branded product session identifier. The new user session may provide access to the user to the co-branded product in the system.

Yet another aspect of the present disclosure relates to a non-transient computer-readable storage medium having instructions embodied thereon, the instructions being executable by one or more processors to perform a method for providing third party access to a system. The method may include receiving, at a system of a first entity, registration information of a user registered with a second entity. The system may include a record associating the user with a co-branded product jointly provided by the first entity and the second entity. The method may include validating, using at least one hardware processor, the registration information at the system based on the record. The method may include initiating, using the at least one processor, and at the system in response to a successful validation of the registration information, a new user session having a co-branded product session identifier. The new user session may provide access to the user to the co-branded product in the system.

According to an aspect, the present disclosure is directed to improvements in computer based systems, and associated technologies, for providing electronic access to a user to one or more co-branded products in a computer system of a first entity. Initially, the system of the first entity may not have a record stored therein for providing access to the user to the co-branded product in the system, for example if the user is not a customer of the first entity. Thus, the user may not have login credentials for accessing the co-branded product the system. According to the present disclosure, the system is configured to be able to provide access to such a user when the system stores, or is able to access, a computer record that associates the user with the co-branded product. The system may validate the user by validating information associated with the user, which may be inputted by the user, based on information in the record. For example, one or more of a phone number, email address, or credit card number may be inputted by the user, or otherwise provided, and the system may search a database of the system for a record containing information that matches the inputted information. If a matching record is located, then a user session may be initiated in the system to provide access to the user to the co-branded product. Accordingly, a system may provide electronic access to a co-branded product to a user, based on information stored in a computer record associating the user with the co-branded product, when the user may not have login credentials to access the co-pending product in the system. This provides a technological improvement in commercial computerized systems by, in part, providing electronic access to a co-branded product in a computer system of a first entity to a user who is not registered with the computer system of the first entity.

For promoting an understanding of the principles of the disclosure, reference will now be made to the features illustrated in the drawings and specific language will be used to describe the same. It will nevertheless be understood that no limitation of the scope of the disclosure is thereby intended. Any alterations and further modifications, and any further applications of the principles of the disclosure as described herein are contemplated as would normally occur to one skilled in the art to which the disclosure relates. It will be apparent to those skilled in the relevant art that some features that are not relevant to the present disclosure may not be shown in the drawings for the sake of clarity.

Certain terms used in this application and their meaning as used in this context are set forth in the description below. To the extent a term used herein is not defined, it should be given the broadest definition persons in the pertinent art have given that term as reflected in at least one printed publication or issued patent. Further, the present processes are not limited by the usage of the terms shown below, as all equivalents, synonyms, new developments and terms or processes that serve the same or a similar purpose are considered to be within the scope of the present disclosure.

FIG. 1 is a system 100 generally showing an example configuration in accordance with the present disclosure where a user registered with a second entity is provided with access to a co-branded product in a computing system of a first entity. System 100 may comprise a computing device 102, which may be used by a user, an example computerized system 130 of a first entity, and an example computerized system 160 of a second entity. Two or more of computing device 102, system 130, and system 160 may be communicatively linked via one or more electronic communication links 104. For example, such electronic communication links may be established, at least in part, via a network such as the Internet and/or other networks.

Computerized system 130 of the first entity shown in FIG. 1 and described herein is only an example, and thus is not limiting. In other embodiments, a computerized system of the first entity may be different.

The user may be a consumer of a co-branded product jointly provided by a first entity, for example a first company, and a second entity, for example a second company. The user may be an existing customer of the second company, but may not necessary be a customer of the first company. While the product may be co-branded, the first company may actually provide some or all of the product. Additionally or alternatively, while the product may be co-branded, access to the product may be provided by the system of the first company. Accordingly, access to the product in the system of the first company may be provided to the user, who initially may not be registered with the first company.

System 160 of the second company may comprise a computing device 140 and a database 150, and database 150 may store a record 152 containing information relating to the user. In this sense, the user may be registered with the second company.

System 130 of the first company may selectively provide access to the user to the co-branded product in system 130. The access may be provided by a computer based user portal. System 130 may comprise a computing device 110, which may include a processor 112 and memory 114. Memory 114 may include one or more applications or modules 116 for providing the user portal, and may include a user interface application or module 118. User interface 118 is configured to provide or otherwise enable access to the system 130 to the user, and may include a graphical user interface component. A user interface may be provided to computing device 102 of the user, and device 102 may output the user interface on a display device of the computing device 102. Furthermore, system 130 may comprise a database 120, for example for storing information relating to co-branded products and users or customers. Database 120 may comprise a record 122 associating the user with the co-branded product. Record 122 may be created in database 120 at any suitable time and in any suitable way.

For example, when the user initially purchases or registers for the co-branded product, record 122 may be created in database 120 of system 130 of the first company to associate the user with the co-branded product. The user may purchase the co-branded product in a manner that does not involve system 130 of the first company. For example, the user may purchase the co-branded product via system 160 of the second company, or in any other suitable way. Accordingly, system 130 may create record 122 associating the user, who is a customer of the second company, but who may not be a customer of the first company, with the co-branded product. Record 122 may be created so that system 130 of the first company has information associating the user with the co-branded product, which may be utilized in the future to, for example, provide the user with access to the co-branded product in system 130. Record 122 may be created in response to system 130 receiving some form of notification that the user has purchased the co-branded product. A notification may originate externally to system 130, for example from system 160 or elsewhere. If the user is not a customer of the first company, system 130 of the first company may not be configured to provide access to the user to the co-branded product in system 130. Thus, the user will not be able to view and manage their co-branded product in system 130.

Computing device 110 of system 130 may be configured to receive registration information of the user registered with the second company, and then to validate the registration information based on record 122 in database 120 associating the user with the co-branded product. In an embodiment, a successful validation may include locating a record or other information containing information that matches, to at least some predefined degree, information in the registration information. In an embodiment, system 130 may be configured to not validate the registration information if a record, such as record 122, or similar information associating the user with the co-branded product cannot be located. Then, in response to a successful validation of the registration information, computing device 110 may be configured to provide access to the user to the co-branded product in system 130. For example, computing device 110 may be further configured to initiate, in response to a successful validation of the registration information, a new user session having a co-branded product session identifier. The new user session may provide access to the user to the co-branded product in the system 130.

Further, in an embodiment, customers of the first entity may access system 130 of the first entity in a usual manner. This may involve a customer locating to a standard user interface of the first entity for accessing system 130. Once the customer successfully logs in to system 130, the customer may be provided with access to some or all of the products provided by the first entity, meaning not co-branded products. In an embodiment, system 130 may only provide the customer with access to products that the customer has purchased. In addition, the customer may also be provided with access to any co-branded products in the system. Further, the customer may additionally be provided with access to system 130 to any co-branded products that they have purchased by logging in via the co-branded user interface configured for users of the second entity. The customer may be granted access via this route since the customer is registered with a co-branded product in system 130.

Figure 2:
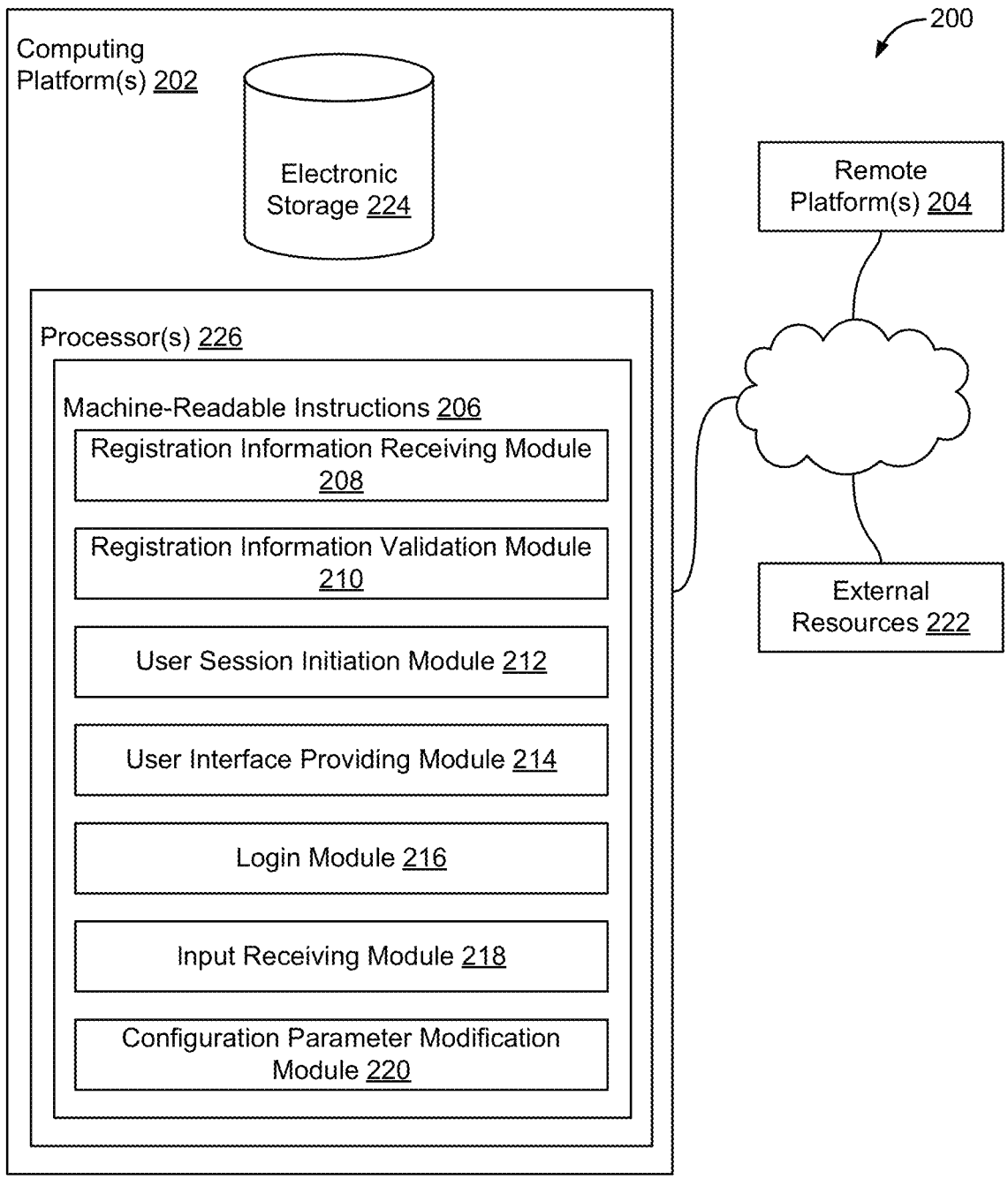
FIG. 2 illustrates a system configured for providing third party access to a system, in accordance with one or more embodiments.

FIG. 2 illustrates an example system 200, in accordance with one or more embodiments. In some embodiments, system 200 may include one or more computing platforms or other apparatuses 202. Computing platform(s) 202 may be configured to communicate with one or more remote platforms 204 according to a client/server architecture, a peer-to-peer architecture, and/or other architectures. Remote platform(s) 204 may be configured to communicate with other remote platforms via computing platform(s) 202 and/or according to a client/server architecture, a peer-to-peer architecture, and/or other architectures. Users may access system 200 via remote platform(s) 204.

Computing platform(s) 202 may be configured by machine-readable instructions 206. Machine-readable instructions 206 may include one or more instruction modules. The instruction modules may include computer program modules. The instruction modules may include one or more of registration information receiving module 208, registration information validation module 210, user session initiation module 212, user interface providing module 214, login module 216, input receiving module 218, configuration parameter modification module 220, and/or other instruction modules.

Registration information receiving module 208 may be configured to receive, at a system of a first entity, registration information of a user registered with a second entity. In an embodiment, registration information may be at least partly inputted by a user, for example into a registration user interface. Registration information may include any suitable type of information, for example one or more of first name, last name, date of birth, postal code, address, phone number, email address, credit card number, information relating to the co-branded product such as receipt number, account number, etc., and so on. The system may include a record associating the user with a co-branded product jointly provided by the first entity and the second entity. In an embodiment, a record or other information associating the user with the co-branded product may be obtained by the system from another computing device. For example, such information may be acquired by system 130 of the first entity from system 160 of the second entity.

In at least one embodiment, the system may provide an online banking service. The co-branded product may be or comprise a financial product, for example but not limited to a loan, a mortgage, or a bank account.

Registration information validation module 210 may be configured to validate, using at least one hardware processor, the registration information at the system based on the record.

User session initiation module 212 may be configured to initiate, using the at least one processor, and at the system in response to a successful validation of the registration information, a new user session having a co-branded product session identifier. The new user session may provide access to the user to the co-branded product in the system.

Registration information validation module 210 may be configured to, when validating the registration information at the system, determine, at the system and using the at least one processor, based on the registration information, that the user has not previously been registered for access to the co-branded product in the system. Additionally or alternatively, it may be determined if the user has not previously been registered for access to any co-branded product jointly provided by the first and second entities. In such cases, the system may not have login information, for example a username and password, for the user. For example, if the user was previously registered for access to a different co-branded product, then an account may already exist in the system for the user, including login information and so on. In such a case, the system may provide an indication that the user is already registered in the system, and may provide an invitation for the user to log in to the system.

Further, if the user has not previously been registered in the system, module 210 may be configured to verify, at the system, and possibly using the at least one processor, the registration information. The verifying the registration information may comprise receiving personal information associated with the user, and identifying the existence of the record associating the user with the co-branded product in the system based on the personal information. Further, in an embodiment, the verifying the registration information may comprise receiving other information associated with the user, for example information related to the co-pending product purchased by the user, for example a receipt number, or account number, and so on. The personal information, and other information if provided, may be used by the system to locate the record, or other information, associating the user with the co-branded product.

Further, module 210 may be configured to register, using the at least one processor, and in response to verifying the registration information, the user for access to the co-branded product in the system. Registering the user may include saving a registration record in the system, which may include the login information of the user, for example username and password, and may also associate the user with the co-branded product.

The personal information associated with the user may comprise any suitable type(s) of information, for example but not limited to any of name, date of birth, address, postal code, phone number, email address, and so on.

FIG. 4 is an example user interface screen for registering a user for access to the co-branded product in the system 130. The user interface screen may include visual indicia, for example company name or logo or other branding, of one or both of the first company and second company. In other embodiments, a user interface screen for registering a user may be different.

Referring again to FIG. 2, the access for the user to the co-branded product in the system may include access for the user to view or manage the co-branded product. Viewing a product may include viewing any suitable information about or relating to the product, such as specifics about the product, details relating to when and how the product was purchased and its price, and so on. Managing a product may include adding, removing, or adjusting one or more configuration parameters relating to a product. For example, if the product is shipped to the user on a monthly basis, the user may adjust the date on which the shipment is made, or change the shipping address, and so on. Further, the system may enable the user to change parameters relating to payment for the product, such as making a payment, changing frequency of payments, payment amounts, payment dates, and so on. In an embodiment, the product could be a financial product, and changes to a product may include, as mere examples, changing a repetitive loan repayment amount, changing a repayment frequency, transferring funds, etc. In relation to FIG. 2, input receiving module 218 may be configured to receive input indicative of a user command during the new user session. Configuration parameter modification module 220 may be configured to modify, in the system, a configuration parameter associated with the co-branded product associated with the user in response to the input.

User interface providing module 214 may be configured to provide a co-branded user interface for enabling access for the user to the co-branded product in the system. The co-branded user interface may be different from a first entity user interface for users registered with the first entity. For example, the co-branded user interface may be different from a user interface that is provided for regular customers of the first entity. The different user interface may indicate to the user that the user is using the correct user interface for accessing the co-branded product, and not using the user interface for the regular customers of the first entity.

User interface providing module 214 may be configured to provide a co-branded user interface for enabling access for the user to the co-branded product in the system. The co-branded user interface may be configured to display visual indicia of both the first entity and the second entity.

Login module 216 may be configured to receive, at the system, login information of the user. Login information may include any suitable information, including but not limited to a username and password. When logging in, the user may already be registered with the first entity for accessing the co-branded product in the system. This registration may have been previously performed, for example by performing a registration process, which may involve a user interface screen such as the one of FIG. 4. The user may be registered with the first entity based on a registration record in the system. Further, login module 216 may be configured to authenticate, using the at least one processor, the received login information at the system based on the registration record. The authenticating may include comparing the inputted username and password information with the username and password information stored in the registration record or elsewhere. Further, login module 216 may be configured to initiate, at the system in response to a successful authentication of the login information, a new user session, which may have a co-branded product session identifier. A session identifier may be a unique string that is created and maintained by the system. The new user session may provide access for the user to the co-branded product in the system.

FIG. 5 is an example user interface screen to enable a user to log into the system, of the first entity, for access to the co-branded product. The user interface screen may include visual indicia, for example company name or logo or other branding, of one or both of the first company ("Name/Logo of 1st Company" in FIGS. 4-8) and second company ("Name/Logo of 2nd Company" in FIGS. 4-8). In other embodiments, a user interface screen for user login may be different.

Referring again to FIG. 2, the system of the first entity may prevent access to the user to any other products provided by the first entity that are not co-branded products, or to any co-branded products that the user has not purchased. In at least one embodiment, the new user session may be used to prevent such access.

In some embodiments, computing platform(s) 202, remote platform(s) 204, and/or external resources 222 may be communicatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 202, remote platform(s) 204, and/or external resources 222 may be communicatively linked via some other communication media.

A given remote platform 204 may include one or more processors configured to execute computer program modules. The computer program modules may be configured to enable an expert or user associated with the given remote platform 204 to interface with system 200 and/or external resources 222, and/or provide other functionality attributed herein to remote platform(s) 204. By way of non-limiting example, a given remote platform 204 and/or a given computing platform 202 may include one or more of a server, a desktop computer, a laptop computer, a handheld computer, a tablet computing platform, a NetBook, a Smartphone, a gaming console, and/or other computing platforms.

External resources 222 may include sources of information outside of system 200, external entities participating with system 200, and/or other resources. In some embodiments, some or all of the functionality attributed herein to external resources 222 may be provided by resources included in system 200. In some embodiments, at least some of the functionality attributed herein to system 200 may be provided by resources included in external resources 222.

Computing platform(s) 202 may include electronic storage 224, one or more processors 226, and/or other components. Computing platform(s) 202 may include communication lines, or ports to enable the exchange of information with a network and/or other computing platforms. Illustration of computing platform(s) 202 in FIG. 2 is not intended to be limiting. Computing platform(s) 202 may include a plurality of hardware, software, and/or firmware components operating together to provide the functionality attributed herein to computing platform(s) 202. For example, computing platform(s) 202 may be implemented by a cloud of computing platforms operating together as computing platform(s) 202.

Electronic storage 224 may comprise non-transitory storage media that electronically stores information. The electronic storage media of electronic storage 224 may include one or both of system storage that is provided integrally (for example substantially non-removable) with computing platform(s) 202 and/or removable storage that is removably connectable to computing platform(s) 202 via, for example, a port (for example a USB port, a firewire port, etc.) or a drive (for example a disk drive, etc.). Electronic storage 224 may include one or more of optically readable storage media (for example optical disks, etc.), magnetically readable storage media (for example magnetic tape, magnetic hard drive, floppy drive, etc.), electrical charge-based storage media (for example EEPROM, RAM, etc.), solid-state storage media (for example flash drive, etc.), and/or other electronically readable storage media. Electronic storage 224 may include one or more virtual storage resources (e.g., cloud storage, a virtual private network, and/or other virtual storage resources). Electronic storage 224 may store software algorithms, information determined by processor(s) 226, information received from computing platform(s) 202, information received from remote platform(s) 204, and/or other information that enables computing platform(s) 202 to function as described herein.

Processor(s) 226 may be configured to provide information processing capabilities in computing platform(s) 202. As such, processor(s) 226 may include one or more of a digital processor, an analog processor, a digital circuit designed to process information, an analog circuit designed to process information, a state machine, and/or other mechanisms for electronically processing information. Although processor(s) 226 is shown in FIG. 2 as a single entity, this is for illustrative purposes only. In some embodiments, processor(s) 226 may include a plurality of processing units. These processing units may be physically located within the same device, or processor(s) 226 may represent processing functionality of a plurality of devices operating in coordination. Processor(s) 226 may be configured to execute modules 208, 210, 212, 214, 216, 218, and/or 220, and/or other modules. Processor(s) 226 may be configured to execute modules 208, 210, 212, 214, 216, 218, and/or 220, and/or other modules by software; hardware; firmware; some combination of software, hardware, and/or firmware; and/or other mechanisms for configuring processing capabilities on processor(s) 226. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 208, 210, 212, 214, 216, 218, and/or 220 are illustrated in FIG. 2 as being implemented within a single processing unit, in embodiments in which processor(s) 226 includes multiple processing units, one or more of modules 208, 210, 212, 214, 216, 218, and/or 220 may be implemented remotely from the other modules. The description of the functionality provided by the different modules 208, 210, 212, 214, 216, 218, and/or 220 described below is for illustrative purposes, and is not intended to be limiting, as any of modules 208, 210, 212, 214, 216, 218, and/or 220 may provide more or less functionality than is described. For example, one or more of modules 208, 210, 212, 214, 216, 218, and/or 220 may be eliminated, and some or all of its functionality may be provided by other ones of modules 208, 210, 212, 214, 216, 218, and/or 220. As another example, processor(s) 226 may be configured to execute one or more additional modules that may perform some or all of the functionality attributed below to one of modules 208, 210, 212, 214, 216, 218, and/or 220.

Figure 3:
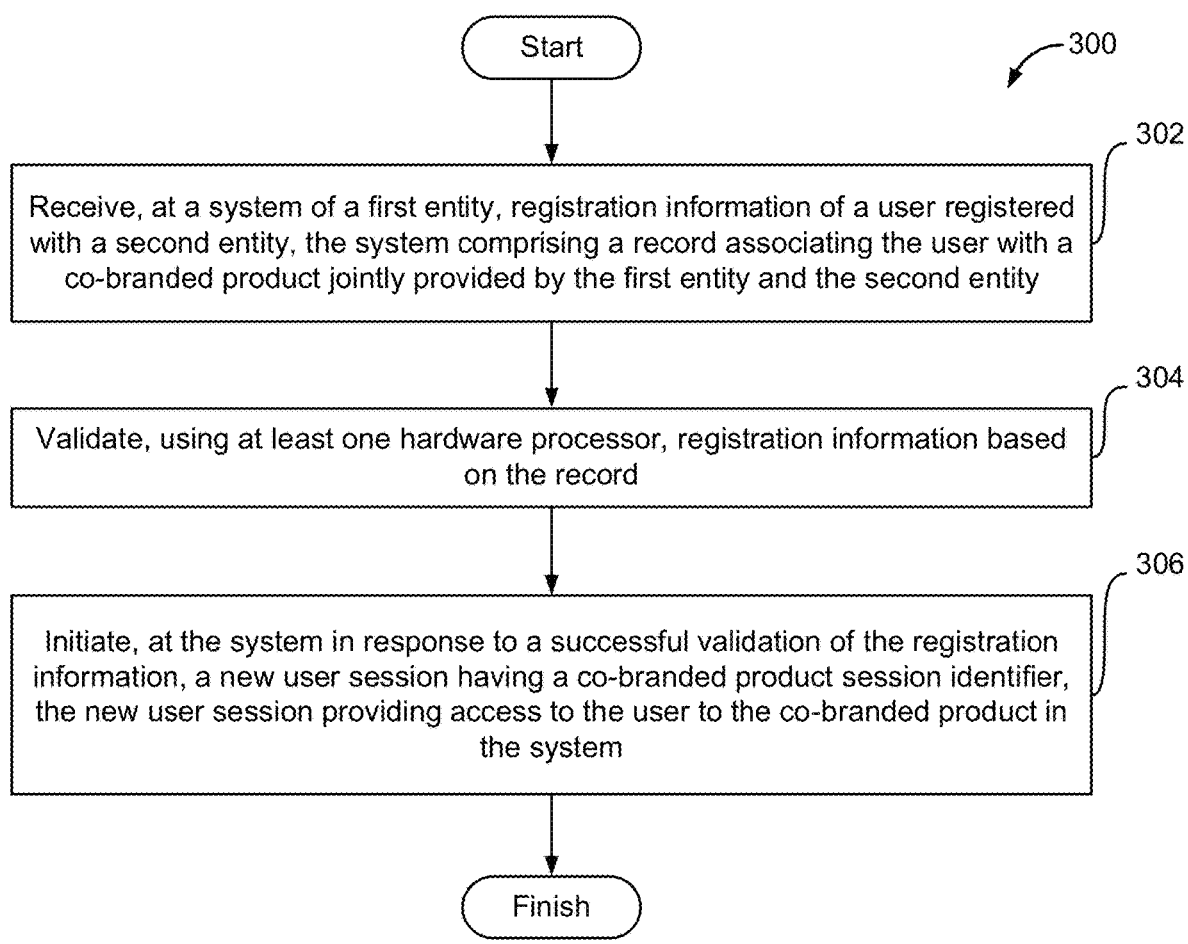
FIG. 3 illustrates a method for providing third party access to a system, in accordance with one or more embodiments.

FIG. 3 illustrates an example method 300, in accordance with one or more embodiments. The operations of method 300 presented below are intended to be illustrative. In some embodiments, method 300 may be accomplished with one or more additional operations not described, and/or without one or more of the operations discussed. Additionally, the order in which the operations of method 300 are illustrated in FIG. 3 and described below is not intended to be limiting.

In some embodiments, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

An operation 302 may include receiving, at a system of a first entity, registration information of a user registered with a second entity. The system may include a record associating the user with a co-branded product jointly provided by the first entity and the second entity. Operation 302 may be performed by one or more hardware processors configured by machine-readable instructions including a module that is the same as or similar to registration information receiving module 208, in accordance with one or more embodiments.

An operation 304 may include validating, using at least one hardware processor, the registration information at the system based on the record. Operation 304 may be performed by one or more hardware processors configured by machine-readable instructions including a module that is the same as or similar to registration information validation module 210, in accordance with one or more embodiments.

An operation 306 may include initiating, using the at least one processor, and at the system in response to a successful validation of the registration information, a new user session having a co-branded product session identifier. The new user session may provide access to the user to the co-branded product in the system. Operation 306 may be performed by one or more hardware processors configured by machine-readable instructions including a module that is the same as or similar to user session initiation module 212, in accordance with one or more embodiments.

In an embodiment, system 130 of the first entity may comprise a legacy application to provide access to products and services to the customers of the first entity. The legacy application may be a fully self-contained application, which includes an embedded customer user interface, and middle tier code. However, when the legacy application is a single, self contained application with its own user interface, adding new and different functionality may be challenging or altogether impractical. Accordingly, adding functionality to provide a user of a third party (or "second entity") with access to a co-branded product in the system of the first entity, may be challenging.

According to an aspect of the present disclosure, a co-branded application is provided to "sit on top" of the legacy application. The co-branded application in effect at least partly breaks apart the legacy application. For example, the co-branded application may separate out the legacy user interface, making the legacy user interface flexible and updatable. Furthermore, the co-branded application may include middle tier code supporting a new user interface, which may be a co-branded user interface, and to interface between the co-branded user interface and the legacy application. The co-branded user interface may be adapted for users of the second entity and may act as a portal to system of the first entity for the users of the second entity.

FIG. 6 is an example user interface screen displaying an account summary of the user associated with the co-pending product. In this example, the screen shows that the user has two co-pending products in their account, namely products XXXX and YYYY. A separate account may be provided for each co-pending product.

FIG. 7 is an example user interface screen showing account details relating to co-pending product XXXX. In the example, details of a payment plan relating to product XXXX are shown, including monthly payment amounts, an external account number, a next payment date, an original balance, an interest rate, an issue date, and the period of time remaining for payment.

FIG. 8 is an example user interface screen security settings for the account or user profile of the user.

The user interface screens of FIGS. 6-8 are merely examples. In other embodiments, user interface screens may be different.

Figure 9:
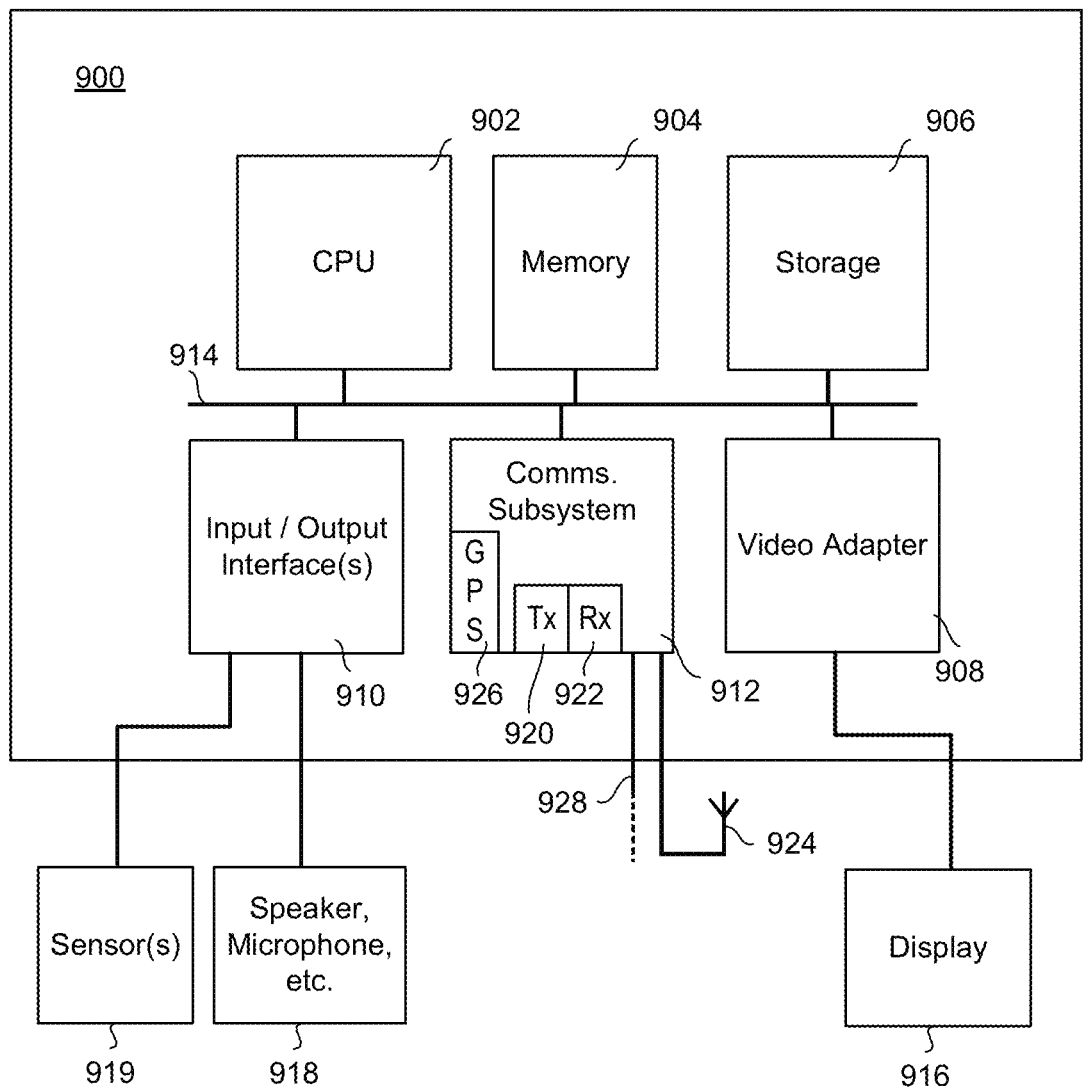
FIG. 9 is a block diagram of an example computing device or system.

FIG. 9 is a block diagram of an example computing device or system 900 that may be used in implementing one or more embodiments, or parts thereof, of the present disclosure. This may include, for example, any of computing device 102, system 130, system 160, or computing platform 202. The computing device 900 may be any suitable type of device, including but not limited to a mobile device, a smartphone, a tablet, a notebook computer, a desktop computer, a server, and a mainframe.

The computing device 900 may include one or more of a central processing unit (CPU) 902, memory 904, a mass storage device 906, a video adapter 908, an input/output (I/O) interface 910, and a communications subsystem 912. One or more of the components or subsystems of computing device 900 may be interconnected by way of one or more buses 914 or in any other suitable manner.

The bus 914 may be one or more of any type of several bus architectures including a memory bus or memory controller, a video bus, peripheral bus, or the like. The CPU 902 may comprise any type of electronic data processor. The memory 904 may comprise any type of system memory such as dynamic random access memory (DRAM), static random access memory (SRAM), synchronous DRAM (SDRAM), read-only memory (ROM), a combination thereof, or the like. In an embodiment, the memory may include ROM for use at boot-up, and DRAM for program and data storage for use while executing programs.

The mass storage device 906 may comprise any type of storage device configured to store data, programs, and other information and to make the data, programs, and other information accessible via the bus 914. The mass storage device may comprise, for example, one or more of a solid state drive, hard disk drive, a magnetic disk drive, an optical disk drive, or the like. In some embodiments, data, programs, or other information may be stored remotely, for example in the cloud. Computing device 900 may send or receive information to the remote storage in any suitable way, including via communications subsystem 912 over a network or other data connection.

The video adapter 908 and the I/O interface 910 may provide interfaces to couple external input and output devices to the computing device. As illustrated, examples of input and output devices include a display 916 coupled to the video adapter 908 and the LED, speaker, or microphone 918 coupled to the I/O interface 910. In addition, one or more sensors 919 may be coupled to I/O interface 910. The one or more sensors 919 may include any suitable type of sensor, including but not limited to one or more accelerometers, pressure sensors, light sensors, acoustic sensors, and temperature sensors. It is to be appreciated, however, that these peripherals and other devices are examples only. Other devices may be coupled or connected to the computing device in addition to or in place of those shown and described. Furthermore, additional or fewer interfaces may be utilized. For example, one or more serial interfaces such as Universal Serial Bus (USB) (not shown) may be provided.

A communications subsystem 912 may be provided for one or both of transmitting and receiving signals. Communications subsystems may include any component or collection of components for enabling communications over one or more wired and wireless interfaces. These interfaces may include but are not limited to USB, Ethernet, high-definition multimedia interface (HDMI), Firewire (e.g. IEEE 1394), Thunderbolt™, WiFi™ (e.g. IEEE 802.11), WiMAX (e.g. IEEE 802.16), Bluetooth™, or Near-field communications (NFC), as well as GPRS, UMTS, LTE, LTE-A, 5G, and dedicated short range communication (DSRC).

Communication subsystem 912 may include one or more ports or other hardware 928 for one or more wired connections. In addition, communication subsystem 912 may include one or more of transmitters 920, receivers 922, and antenna elements 924. In at least some embodiments, the computing device may have geographic positioning functionality, for example to determine a geographical position of the computing device or for receiving timing signals for time synchronization of the device with other systems. In at least some embodiments, the computing device may be capable of receiving Global Positioning System (GPS) signals. Therefore in at least one embodiment, as shown in FIG. 9, the computing device may comprise a GPS radio or receiver 926. However, other embodiments may comprise and use other subsystems or components for, for example, determining the geographical position of the computing device or for receiving timing signals for time synchronization. In some embodiments, the computing device may be configured to determine a geographic location using WiFi.

The computing device 900 of FIG. 9 is merely an example and is not meant to be limiting. Various embodiments may utilize some or all of the components shown or described. Some embodiments may use other components not shown or described but known to persons skilled in the art. Furthermore, a device may contain multiple instances of a component, such as multiple computing device, processors, memories, transmitters, receivers, etc. The computing device may comprise one or more input/output devices, such as a speaker, microphone, mouse, touchscreen, keypad, keyboard, display, and the like. Various other options and configurations are contemplated.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a compact disk read only memory (CD-ROM), digital versatile disk (DVD), Blu-ray Disc Read Only Memory (BD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

The structure, features, accessories, and/or alternatives of embodiments described and/or shown herein, including one or more aspects thereof, are intended to apply generally to all of the teachings of the present disclosure, including to all of the embodiments described and illustrated herein, insofar as they are compatible. Thus, the present disclosure includes embodiments having any combination or permutation of features of embodiments or aspects herein described.

In addition, the steps and the ordering of the steps of methods and data flows described and/or illustrated herein are not meant to be limiting. Methods and data flows comprising different steps, different number of steps, and/or different ordering of steps are also contemplated. Furthermore, although some steps are shown as being performed consecutively or concurrently, in other embodiments these steps may be performed concurrently or consecutively, respectively.

In at least some embodiments, one or more aspects or components may be implemented by one or more special-purpose computing devices. The special-purpose computing devices may be any suitable type of computing device, including desktop computers, portable computers, handheld computing devices, networking devices, or any other computing device that comprises hardwired and/or program logic to implement operations and features according to the present disclosure.

The terms "a" or "an" are generally used to mean one or more than one. Furthermore, the term "or" is used in a non-exclusive manner, meaning that "A or B" includes "A but not B," "B but not A," and "both A and B" unless otherwise indicated. In addition, the terms "first," "second," and "third," and so on, are used only as labels for descriptive purposes, and are not intended to impose numerical requirements or any specific ordering on their objects.

Some example embodiments according to the present disclosure can be described with reference to the following clauses, with some specific example features laid out in with respect to example implementations.

One aspect of the present disclosure relates to a system configured for providing third party access to a system. The system may include one or more hardware processors configured by machine-readable instructions. The processor(s) may be configured to receive, at a system of a first entity, registration information of a user registered with a second entity. The system may include a record associating the user with a co-branded product jointly provided by the first entity and the second entity. The processor(s) may be configured to validate the registration information at the system based on the record. The processor(s) may be configured to initiate in response to a successful validation of the registration information, a new user session having a co-branded product session identifier. The new user session may provide access to the user to the co-branded product in the system.

In some implementations of the system, the processor(s) may be configured to provide a co-branded user interface for enabling access for the user to the co-branded product in the system. In some implementations of the system, the co-branded user interface may be different from a first entity user interface for users registered with the first entity.

In some implementations of the system, the processor(s) may be configured to, when validating the registration information at the system, determine, based on the registration information, that the user has not previously been registered for access to the co-branded product in the system. In some implementations of the system, the processor(s) may be configured to receive personal information associated with the user. In some implementations of the system, the processor(s) may be configured to identify the existence of the record associating the user with the co-branded product in the system based on the personal information. In some implementations of the system, the processor(s) may be configured to register, in response to verifying the registration information, the user for access to the co-branded product in the system.

In some implementations of the system, the processor(s) may be configured to receive, at the system, login information of the user. In some implementations of the system, the user may be registered with the first entity for accessing the co-branded product in the system. In some implementations of the system, the user may be registered with the first entity based on a registration record in the system. In some implementations of the system, the processor(s) may be configured to authenticate the login information at the system based on the registration record. In some implementations of the system, the processor(s) may be configured to initiate, in response to a successful authentication of the login information, a new user session, which may have a co-branded product session identifier. In some implementations of the system, the new user session may provide access for the user to the co-branded product in the system.

In some implementations of the system, the processor(s) may be configured to provide a co-branded user interface for enabling access for the user to the co-branded product in the system. In some implementations of the system, the co-branded user interface may be configured to display visual indicia of both the first entity and the second entity.

In some implementations of the system, the processor(s) may be configured to receive input indicative of a user command during the new user session. In some implementations of the system, the processor(s) may be configured to modify, in the system, a configuration parameter associated with the co-branded product associated with the user in response to the input.

In some implementations of the system, the new user session may prevent access to the user to any other products provided by the first entity that are not co-branded products.

In some implementations of the system, the access for the user to the co-branded product in the system may include access for the user to view or manage the co-branded product.

In some implementations of the system, the system may provide an online banking service and wherein the co-branded product is a financial product.

Another aspect of the present disclosure relates to a method for providing third party access to a system. The method may include receiving, at a system of a first entity, registration information of a user registered with a second entity. The system may include a record associating the user with a co-branded product jointly provided by the first entity and the second entity. The method may include validating, using at least one hardware processor, the registration information at the system based on the record. The method may include initiating, using the at least one processor, and at the system in response to a successful validation of the registration information, a new user session having a co-branded product session identifier. The new user session may provide access to the user to the co-branded product in the system.

In some implementations of the method, it may include providing a co-branded user interface for enabling access for the user to the co-branded product in the system. In some implementations of the method, the co-branded user interface may be different from a first entity user interface for users registered with the first entity.

In some implementations of the method, it may include, when validating the registration information at the system, determining, at the system and using the at least one processor, based on the registration information, that the user has not previously been registered for access to the co-branded product in the system. In some implementations, the method may include verifying the registration information by receiving personal information associated with the user. In some implementations, the method may verify the registration information by identifying the existence of the record associating the user with the co-branded product in the system based on the personal information. In some implementations, the method may register, in response to verifying the registration information, the user for access to the co-branded product in the system.

In some implementations of the method, it may include receiving, at the system, login information of the user. In some implementations of the method, the user may be registered with the first entity for accessing the co-branded product in the system. In some implementations of the method, the user may be registered with the first entity based on a registration record in the system. In some implementations, the method authenticates the login information based on the registration record. In some implementations, the method initiates, in response to a successful authentication of the login information, a new user session, which may have a co-branded product session identifier. In some implementations of the method, the new user session may provide access for the user to the co-branded product in the system.

In some implementations of the method, it may include providing a co-branded user interface for enabling access for the user to the co-branded product in the system, where the co-branded user interface may be configured to display visual indicia of both the first entity and the second entity.

In some implementations of the method, it may include receiving input indicative of a user command during the new user session. In some implementations of the method, it may include modifying, in the system, a configuration parameter associated with the co-branded product associated with the user in response to the input.

In some implementations of the method, the new user session may prevent access to the user to any other products provided by the first entity that are not co-branded products.

In some implementations of the method, the access for the user to the co-branded product in the system may include access for the user to view or manage the co-branded product.

In some implementations of the method, the system may provide an online banking service and wherein the co-branded product is a financial product.

Yet another aspect of the present disclosure relates to a non-transient computer-readable storage medium having instructions embodied thereon, the instructions being executable by one or more processors to perform a method for providing third party access to a system. The method may include receiving, at a system of a first entity, registration information of a user registered with a second entity. The system may include a record associating the user with a co-branded product jointly provided by the first entity and the second entity. The method may include validating, using at least one hardware processor, the registration information at the system based on the record. The method may include initiating, using the at least one processor, and at the system in response to a successful validation of the registration information, a new user session having a co-branded product session identifier. The new user session may provide access to the user to the co-branded product in the system.

In some implementations of the computer-readable storage medium, the method may include providing a co-branded user interface for enabling access for the user to the co-branded product in the system. In some implementations of the computer-readable storage medium, the co-branded user interface may be different from a first entity user interface for users registered with the first entity.

In some implementations of the computer-readable storage medium, the method may include, when validating the registration information at the system, determining, at the system and using the at least one processor, based on the registration information, that the user has not previously been registered for access to the co-branded product in the system. In some implementations of the computer-readable storage medium, the method may include verifying the registration information by receiving personal information associated with the user, and identifying the existence of the record associating the user with the co-branded product in the system based on the personal information. In some implementations of the computer-readable storage medium, the method may include registering, in response to verifying the registration information, the user for access to the co-branded product in the system.

In some implementations of the computer-readable storage medium, the method may include receiving, at the system, login information of the user. In some implementations of the computer-readable storage medium, the user may be registered with the first entity for accessing the co-branded product in the system. In some implementations of the computer-readable storage medium, the user may be registered with the first entity based on a registration record in the system. In some implementations of the computer-readable storage medium, the method may include authenticating the login information at the system based on the registration record. In some implementations of the computer-readable storage medium, the method may include initiating, in response to a successful authentication of the login information, a new user session may have a co-branded product session identifier. In some implementations of the computer-readable storage medium, the new user session may provide access for the user to the co-branded product in the system.

In some implementations of the computer-readable storage medium, the method may include providing a co-branded user interface for enabling access for the user to the co-branded product in the system. In some implementations of the computer-readable storage medium, the co-branded user interface may be configured to display visual indicia of both the first entity and the second entity.

In some implementations of the computer-readable storage medium, the method may include receiving input indicative of a user command during the new user session. In some implementations of the computer-readable storage medium, the method may include modifying, in the system, a configuration parameter associated with the co-branded product associated with the user in response to the input.

In some implementations of the computer-readable storage medium, the new user session may prevent access to the user to any other products provided by the first entity that are not co-branded products.

In some implementations of the computer-readable storage medium, the access for the user to the co-branded product in the system may include access for the user to view or manage the co-branded product.

In some implementations of the computer-readable storage medium, the system may provide an online banking service and wherein the co-branded product is a financial product.

Still another aspect of the present disclosure relates to a system configured for providing third party access to a system. The system may include means for receiving, at a system of a first entity, registration information of a user registered with a second entity. The system may include a record associating the user with a co-branded product jointly provided by the first entity and the second entity. The system may include means for validating, using at least one hardware processor, the registration information at the system based on the record. The system may include means for initiating, using the at least one processor, and at the system in response to a successful validation of the registration information, a new user session having a co-branded product session identifier. The new user session may provide access to the user to the co-branded product in the system.

In some implementations of the system, the system may include means for providing a co-branded user interface for enabling access for the user to the co-branded product in the system. In some implementations of the system, the co-branded user interface may be different from a first entity user interface for users registered with the first entity.

In some implementations of the system, the system may include means for, when validating the registration information at the system, determining, at the system and using the at least one processor, based on the registration information, that the user has not previously been registered for access to the co-branded product in the system. In some implementations of the system, the system may include means for verifying the registration information by receiving personal information associated with the user. In some implementations of the system, the system may include means for identifying the existence of the record associating the user with the co-branded product in the system based on the personal information. In some implementations of the system, the system may include means for registering, in response to verifying the registration information, the user for access to the co-branded product in the system.

In some implementations of the system, the system may include means for receiving login information of the user. In some implementations of the system, the user may be registered with the first entity for accessing the co-branded product in the system. In some implementations, the user may be registered with the first entity based on a registration record in the system. In some implementations, the system may include means for authenticating, the login information at the system based on the registration record. In some implementations, the system may include means for initiating, in response to a successful authentication of the login information, a new user session, which may have a co-branded product session identifier. In some implementations of the system, the new user session may provide access for the user to the co-branded product in the system.

In some implementations of the system, the system may include means for providing a co-branded user interface for enabling access for the user to the co-branded product in the system. In some implementations of the system, the co-branded user interface may be configured to display visual indicia of both the first entity and the second entity.

In some implementations of the system, the system may include means for receiving input indicative of a user command during the new user session. In some implementations of the system, the system may include means for modifying, in the system, a configuration parameter associated with the co-branded product associated with the user in response to the input.

In some implementations of the system, the new user session may prevent access to the user to any other products provided by the first entity that are not co-branded products.

In some implementations of the system, the access for the user to the co-branded product in the system may include access for the user to view or manage the co-branded product.

In some implementations of the system, the system may provide an online banking service and wherein the co-branded product is a financial product.

Even another aspect of the present disclosure relates to a computing platform configured for providing third party access to a system. The computing platform may include a non-transitory computer-readable storage medium having executable instructions embodied thereon. The computing platform may include one or more hardware processors configured to execute the instructions. The processor(s) may execute the instructions to receive, at a system of a first entity, registration information of a user registered with a second entity. The system may include a record associating the user with a co-branded product jointly provided by the first entity and the second entity. The processor(s) may execute the instructions to validate, using at least one hardware processor, the registration information at the system based on the record. The processor(s) may execute the instructions to initiate, using the at least one processor, and at the system, in response to a successful validation of the registration information, a new user session having a co-branded product session identifier. The new user session may provide access to the user to the co-branded product in the system.

In some implementations of the computing platform, the processor(s) may execute the instructions to provide a co-branded user interface for enabling access for the user to the co-branded product in the system. In some implementations of the computing platform, the co-branded user interface may be different from a first entity user interface for users registered with the first entity.

In some implementations of the computing platform, the processor(s) may execute the instructions to, when validating the registration information at the system, determine, based on the registration information, that the user has not previously been registered for access to the co-branded product in the system. In some implementations of the computing platform, the processor(s) may execute the instructions to verify the registration information by receiving personal information associated with the user. In some implementations of the computing platform, the processor(s) may execute the instructions to identify the existence of the record associating the user with the co-branded product in the system based on the personal information. In some implementations of the computing platform, the processor(s) may execute the instructions to register, in response to verifying the registration information, the user for access to the co-branded product in the system.

In some implementations of the computing platform, the processor(s) may execute the instructions to receive, at the system, login information of the user. In some implementations of the computing platform, the user may be registered with the first entity for accessing the co-branded product in the system. In some implementations of the computing platform, the user may be registered with the first entity based on a registration record in the system. In some implementations of the computing platform, the processor(s) may execute the instructions to authenticate the login information at the system based on the registration record. In some implementations of the computing platform, the processor(s) may execute the instructions to initiate, in response to a successful authentication of the login information, a new user session, which may have a co-branded product session identifier. In some implementations of the computing platform, the new user session may provide access for the user to the co-branded product in the system.

In some implementations of the computing platform, the processor(s) may execute the instructions to provide a co-branded user interface for enabling access for the user to the co-branded product in the system. In some implementations of the computing platform, the co-branded user interface may be configured to display visual indicia of both the first entity and the second entity.

In some implementations of the computing platform, the processor(s) may execute the instructions to receive input indicative of a user command during the new user session. In some implementations of the computing platform, the processor(s) may execute the instructions to modify, in the system, a configuration parameter associated with the co-branded product associated with the user in response to the input.

In some implementations of the computing platform, the new user session may prevent access to the user to any other products provided by the first entity that are not co-branded products.

In some implementations of the computing platform, the access for the user to the co-branded product in the system may include access for the user to view or manage the co-branded product.

In some implementations of the computing platform, the system may provide an online banking service and wherein the co-branded product is a financial product.

The invention claimed is:

1. An apparatus comprising:
a non-transitory computer-readable storage medium having executable instructions embodied thereon; and
one or more hardware processors configured to execute the instructions to:
receive, at a first system of a first entity, a record associated with a second system of a second entity, the record associating a user with a co-branded product jointly provided by the first entity and the second entity;
receive, at the first system, registration information of the user registered with the second entity;
validate the registration information at the first system based on the record;
initiate, at the first system in response to a successful validation of the registration information, a new user session having a co-branded product session identifier, the new user session providing access to the user to the co-branded product in the first system;
receive input indicative of a user command during the new user session; and
modify, in the first system, a configuration parameter associated with the co-branded product associated with the user in response to the input.

2. The apparatus of claim 1, wherein the one or more hardware processors are further configured to execute the instructions to:
provide a co-branded user interface for enabling access for the user to the co-branded product in the first system, the co-branded user interface being different from a first entity user interface for users registered with the first entity.

3. The apparatus of claim 1, wherein the one or more hardware processors are further configured to execute the instructions to:
when validating the registration information at the first system:
determine, at the first system, based on the registration information, that the user has not previously been registered for access to the co-branded product in the first system;
verify, at the first system, the registration information by:
receiving personal information associated with the user;

identifying the existence of the record associating the user with the co-branded product in the first system based on the personal information; and register, in response to verifying the registration information, the user for access to the co-branded product in the first system.

4. The apparatus of claim 1, wherein the one or more hardware processors are further configured to execute the instructions to:

receive, at the first system, login information of the user, wherein the user is registered with the first entity for accessing the co-branded product in the first system, wherein the user is registered with the first entity based on a registration record in the first system;

authenticate the login information at the first system based on the registration record; and initiate, at the first system in response to a successful authentication of the login information, a further new user session having a co-branded product session identifier, the further new user session providing access for the user to the co-branded product in the first system.

5. The apparatus of claim 1, wherein the one or more hardware processors are further configured to execute the instructions to:

provide a co-branded user interface for enabling access for the user to the co-branded product in the first system, the co-branded user interface configured to display visual indicia of both the first entity and the second entity.

6. The apparatus of claim 1, wherein the new user session prevents access to the user to any other products provided by the first entity that are not co-branded products.

7. The apparatus of claim 1, wherein the access for the user to the co-branded product in the first system includes access for the user to view or manage the co-branded product.

8. The apparatus of claim 1, wherein the first system provides an online banking service and wherein the co-branded product is a financial product.

9. A computer-implemented method comprising:

receiving, at a first system of a first entity, a record associated with a second system of a second entity, the record associating a user with a co-branded product jointly provided by the first entity and the second entity;

receiving, at the first system of the first entity, registration information of the user registered with the second entity;

validating, using at least one hardware processor, the registration information at the first system based on the record;

initiating, using the at least one processor, and at the first system in response to a successful validation of the registration information, a new user session having a co-branded product session identifier, the new user session providing access to the user to the co-branded product in the first system;

receiving input indicative of a user command during the new user session; and modifying, in the first system, a configuration parameter associated with the co-branded product associated with the user in response to the input.

10. The computer-implemented method of claim 9, further comprising:

providing a co-branded user interface for enabling access for the user to the co-branded product in the first system, the co-branded user interface being different from a first entity user interface for users registered with the first entity.

11. The computer-implemented method of claim 9, further comprising:

when validating the registration information at the first system:

determining, at the first system and using the at least one processor, based on the registration information, that the user has not previously been registered for access to the co-branded product in the first system;

verify, at the first system and using the at least one processor, the registration information by:

receiving personal information associated with the user;

identifying the existence of the record associating the user with the co-branded product in the first system based on the personal information; and register, using the at least one processor, in response to verifying the registration information, the user for access to the co-branded product in the first system.

12. The computer-implemented method of claim 9, further comprising:

receiving, at the first system, login information of the user, wherein the user is registered with the first entity for accessing the co-branded product in the first system, wherein the user is registered with the first entity based on a registration record in the first system;

authenticate, using the at least one processor, the login information at the first system based on the registration record; and initiate, at the first system in response to a successful authentication of the login information, a further new user session having a co-branded product session identifier, the further new user session providing access for the user to the co-branded product in the first system.

13. The computer-implemented method of claim 9, further comprising:

providing a co-branded user interface for enabling access for the user to the co-branded product in the first system, the co-branded user interface configured to display visual indicia of both the first entity and the second entity.

14. The computer-implemented method of claim 9, wherein the new user session prevents access to the user to any other products provided by the first entity that are not co-branded products.

15. The computer-implemented method of claim 9, wherein the access for the user to the co-branded product in the first system includes access for the user to view or manage the co-branded product.

16. The computer-implemented method of claim 9, wherein the first system provides an online banking service and wherein the co-branded product is a financial product.

17. A non-transitory computer-readable storage medium having instructions embodied thereon, the instructions being executable by one or more processors to perform a method comprising:

receiving, at a first system of a first entity, a record associated with a second system of a second entity, the record associating a user with a co-branded product jointly provided by the first entity and the second entity;

receiving, at the first system of the first entity, registration information of the user registered with the second entity;

validating, using at least one processor, the registration information at the first system based on the record;

initiating, using the at least one processor, and at the first system in response to a successful validation of the registration information, a new user session having a co-branded product session identifier, the new user session providing access to the user to the co-branded product in the first system;

receiving input indicative of a user command during the new user session; and modifying, in the first system, a configuration parameter associated with the co-branded product associated with the user in response to the input.

18. The non-transitory computer-readable storage medium of claim 17, wherein the method further comprises:

providing a co-branded user interface for enabling access for the user to the co-branded product in the first system, the co-branded user interface being different from a first entity user interface for users registered with the first entity.

* * * * *